Oct. 18, 1949.  E. L. SHAW  2,485,218
WING TIP VORTEX REDUCER FOR AIRCRAFT
Filed Oct. 18, 1943

Inventor
Elgin L. Shaw
By A. H. Oldham
Attorney

Patented Oct. 18, 1949

2,485,218

UNITED STATES PATENT OFFICE 2,485,218

WING TIP VORTEX REDUCER FOR AIRCRAFT

Elgin L. Shaw, Cuyahoga Falls, Ohio, assignor to Goodyear Aircraft Corporation, Akron, Ohio, a corporation of Delaware Application October 18, 1943, Serial No. 506,707

9 Claims. (Cl. 244—130)

This invention relates to aircraft and, in particular, to a device for influencing the air flow around the tips of airplane wings.

It is a well-known fact that the air underneath an airplane wing tends to move around the wing tip from the bottom, which has a greater air pressure, to the top, which has a lower air pressure, thereby creating vortices which contribute to the inefficiencies of the wing and reduce its lifting power. Various means and methods have been suggested to overcome this difficulty, however, none of the suggestions seem to have solved this problem satisfactorily.

The general object of this invention is to reduce or eliminate the air flow from the high-pressure side to the low-pressure side of an airplane wing and thereby to increase the wing lift and performance of the airplane, in much the same manner as increasing the aspect ratio of conventional airplane wings.

According to the present invention, the vortices formed at the wing tip are counteracted by a body of revolution in the form of an air foil which fairs into the wing tip and rotates in such direction as to cause circulation opposing the normal wing tip vortices.

Figure 1:
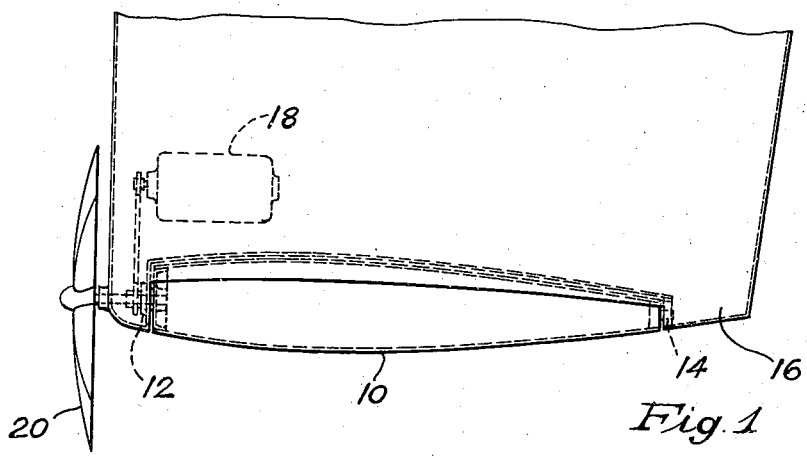
Figure 2:
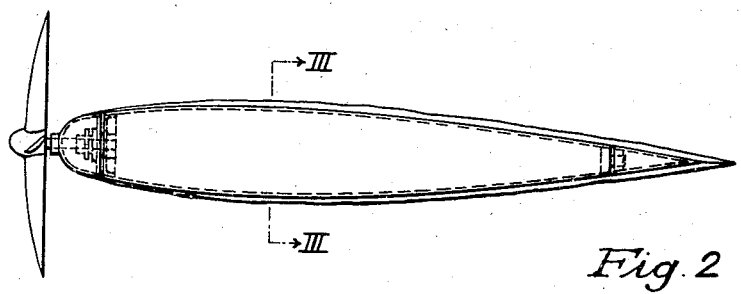
Figure 3:
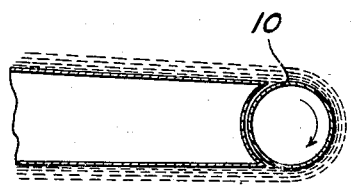

For a better understanding of this invention, reference may be had to the accompanying drawing, wherein Figure 1 is a plan view of a wing tip incorporating the invention; Figure 2 is an end elevation of the wing tip of Figure 1; Figure 3 is a cross-sectional view taken on line 3—3 of Figure 2; and Figure 4 is a modification of Figure 3.

More particularly, a rotor, designated by the numeral 10, is mounted in bearings 12 and 14 attached to a wing terminus or tip 16, one at the front and one at the rear, respectively. The longitudinal shape of the rotor, partially surrounded by the end face of the wing, is streamlined and substantially conforms to the cross-sectional contour of the wing. An electric or other motor 18, within the wing, is provided to drive the rotor in a direction from the low pressure, or upper, side to the high pressure, or lower, side of the wing. This motor may be used for turning the rotor only, until the airplane is in flight, or the motor may be used to continuously drive the rotor. In the first case, the motor 18 will be disengaged after the airplane has assumed sufficient speed and an air-driven impeller 20, secured to the shaft of the rotor, will then serve to drive the rotor.

Figure 4:
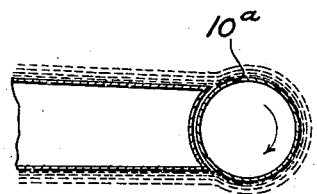

The embodiment of the invention shown in Figure 4 is similar to that of Figure 3, and, accordingly, like numerals have been used in Figure 4, except that the suffix "a" has been added. The structure of Figure 4 differs from that of Figure 3 only in that the rotor 10a is somewhat larger than the rotor 10 to provide a greater vortex-eliminating action at the same revolutions per minute.

Due to the fact that the rotor is of stream-lined shape and has no protruding parts, as is the case with prior constructions, and because the rotor actually opposes the air flow around the wing tip, it is a particularly practicable and efficient means for preventing vortex-creating air flow from top to bottom of a wing tip.

It is to be understood that the illustrations shown in the drawing do not exhaust the number of constructions possible with this invention, but many deviations therefrom may be made without departing from the spirit and scope of the appended claims. For example, this invention is applicable not only to the specific case of fixed wing tips, but to all surfaces or parts of aircraft where similar detrimental overflow conditions may exist, such as rotary wing tips, control surfaces, propellers and the like. Again, the rotor may be made in the form of a plurality of rotary segments if this is found convenient to a given use or installation.

What is claimed is:

1. In combination, a rigid wing of an aircraft, a rotor positioned with its rotating axis substantially parallel with the direction of flight and forming a wing tip, said rotor having circular cross-section and a longitudinal contour corresponding substantially to that of the cross-sectional shape of said airfoil at its outer end, bearing means for the rotor mounted in said wing, and means for driving said rotor in the direction from the low pressure side to the high pressure side of said wing.

2. In combination with a supporting surface of an aircraft, a streamlined, rigid rotor of circular cross-section journaled with its rotating axis substantially parallel with the direction of surface movement and forming a terminus to the surface, the longitudinal contour of the rotor corresponding substantially to that of the cross-section of said surface, and means for rotating the rotor from the low to the high pressure side of said surface.

3. In combination with a supporting surface of an aircraft, a streamlined, rigid rotor of circular cross-section journaled with its rotating axis substantially parallel with the direction of surface movement and forming a terminus to the surface, the longitudinal contour of the rotor corresponding substantially to that of the cross-section of said surface but the diameter of the rotor being a fraction larger at any selected section than the adjacent thickness of the surface, bearing means for the rotor mounted in the surface, and means for driving the rotor in a direction from the low-pressure side of the high-pressure side of said surface.

4. In combination with the supporting surface of an aircraft, a streamlined, rigid rotor of circular cross-section substantially fairing into the upper and lower face of said supporting surface and journaled with its rotating axis substantially parallel with the direction of surface movement and forming a terminus to the surface, bearing means for the rotor mounted in said surface, and power means driving said rotor in the direction from the low-pressure side to the high-pressure side of said surface.

5. In combination with the supporting surface of an aircraft, a streamlined, rigid rotor of circular cross-section journaled with its rotating axis substantially parallel with the direction of surface movement and forming an outer end to the surface, the longitudinal contour of the rotor corresponding substantially to the cross-sectional shape of said surface at its outer end, bearing means for the rotor mounted in said surface, and an air impeller driving said rotor in the direction from the low-pressure side to the high-pressure side of said surface.

6. In combination with the supporting surface of an aircraft, a streamlined, rigid rotor of circular cross-section journaled with its rotating axis substantially parallel with the direction of surface movement and forming an outer end to the surface, the longitudinal contour of the rotor corresponding substantially to the cross-sectional shape of said surface at its outer end, bearing means for the rotor mounted in said surface, and power means positioned internally of the surface and an air impeller positioned externally of the surface for driving said rotor in a direction from the low-pressure side to the high-pressure side of said surface.

7. In combination with an aircraft wing containing a recess at its outer edge substantially parallel to the direction of flight, said recess being spaced from the leading edge and from the trailing edge of said wing, a rotor of circular cross-section fitting with a portion thereof into said recess and being rotatable from the low pressure side to the high pressure side of said wing between said spaced leading edge and trailing edge wing portions and forming together therewith the tip of said wing, and means for rotating said rotor.

8. In combination with an aircraft wing, a stream-lined rotor of circular cross-section attached adjacent the outermost end of and forming the tip of the wing, and means for rotating the rotor about its longitudinal axis substantially at right angles to the direction of wing movement with the upper side of the rotor turning away from the wing.

9. In combination with an aircraft wing, a stream-lined rotor of circular cross-section attached adjacent the outermost end of and forming the tip of the wing and fairing into same, and means for rotating the rotor about its longitudinal axis substantially at right angles to the direction of the wing movement with the upper side of the rotor turning away from the wing.

ELGIN L. SHAW.

REFERENCES CITED

The following references are of record in the file of this patent:

UNITED STATES PATENTS

| Number | Name | Date |
| --- | --- | --- |
| 1,273,166 | Erway | July 23, 1918 |
| 1,541,195 | Smith | June 9, 1925 |
| 1,865,859 | Jacobs | July 5, 1932 |
| 1,879,594 | Trey | Sept. 27, 1932 |

FOREIGN PATENTS

| Number | Country | Date |
| --- | --- | --- |
| 474,215 | France | Nov. 12, 1914 |